United States Patent [19]
Chen

[11] Patent Number: 5,462,415
[45] Date of Patent: Oct. 31, 1995

[54] PUMP HANGER FOR AN AQUARIUM

[76] Inventor: Shan-Hu Chen, 483 Hsin-Sing Road, Tainan, Taiwan

[21] Appl. No.: 276,633

[22] Filed: Jul. 18, 1994

[51] Int. Cl.⁶ ............................. A01K 63/04; F04B 53/22
[52] U.S. Cl. ............................ 417/360; 417/361; 248/214
[58] Field of Search .................................. 248/214, 220.2; 417/360, 361; 119/247, 263, 261, 262

[56] References Cited

U.S. PATENT DOCUMENTS

| | | | |
|---|---|---|---|
| 4,301,767 | 11/1981 | Willinger et al. | 248/214 X |
| 4,512,724 | 4/1985 | Horvath | 417/360 X |
| 4,872,816 | 10/1989 | Fetcko | 417/360 |
| 5,236,162 | 8/1993 | Desjardins | 248/214 |

Primary Examiner—Richard E. Gluck
Attorney, Agent, or Firm—Bacon & Thomas

[57] ABSTRACT

A pump hanger for an aquarium having a pump firmly fixed with a vertical plate, the vertical plate having T-shaped keys on its upper end surface to fit up through a through hole in each of two recesses in a horizontal plate portion of an L-shaped plate frame, the keys possible to engage any of divided grooves in each recesses to adjust and secure the position of the vertical plate, the distance between the vertical plate and the vertical portion of the L-shaped plate frame being adjusted by the position of the vertical plate adjusted to suit to the thickness of a vertical glass of an aquarium to hang this pump hanger thereon.

1 Claim, 5 Drawing Sheets

PUMP HANGER FOR AN AQUARIUM

BACKGROUND OF THE INVENTION

This invention concerns a pump hanger for an aquarium, particularly one possible to be hung on a vertical glass of an aquarium with convenience, and adjustable to suit to the thickness of the glass easily.

A known conventional pump hanger for an aquarium shown in FIG. 1 comprises a pump 10, a movable vertical plate 11 and an L-shaped plate frame 12 combined together.

The pump 10 has two upright projections 101, 101 on its upper surface and two air holes 102, 102 in its lower side surface, and an air tube 103 respectively fixed on each air hole 102.

The movable vertical plate 1i has two sidewise short posts 110, 110 to fit firmly in the projections 101, 101 of the pump 10 and two upright threaded short posts 111 on its upper side surface.

The L-shaped plate frame 12 has horizontal portion and a vertical portion, the horizontal portion provided with two parallel spaced slots 120, 120 for the two threaded posts 111, 111 of the movable vertical plate 11 to fit through up and to screw with a wing nut 13 so that the movable plate 11 may be moved nearer or farther away from the vertical portion of the frame 12. Then the distance between the movable plate 11 and the vertical portion of the frame 12 can be adjusted to suit to the thickness of a vertical glass of an aquarium, enabling the pump hanger hung on the upper portion of the glass of the aquarium.

In installing, moving or taking this conventional pump hanger on or off an aquarium, the wing nuts 13, 13 always have to be screwed tight or loose, with the pump 10 supported with a hand. Chances are that the pump may fall down and be broken owning to careless handling. Besides, frequent screwing of the wing nuts 13, 13 on the threaded posts 11, 11 may wear off the threads of the both 11, 13. And no means is used to secure the two air tubes 103, 103, which is not convenient for handling.

SUMMARY OF THE INVENTION

The object of this invention is to offer a kind of pump hanger simple to install or move or take off an aquarium.

The main feature of the present invention comprises a movable plate combined firmly with a pump, and an L-shaped plate frame having a horizontal portion and a vertical portion, the horizontal portion having one or more recesses with a longitudinal passageway, a through ho i e at the front of the passageway and a plurality of divided grooves beside the both sides of the passageway. The movable plate has one or more T-shaped keys to fit up through the through hole in the recess(es) and to engage selectably with any of the divided grooves so that the movable plate can be secured in the position selected in order to adjust the distance between the movable plate and the vertical portion of the frame to suit to the thickness of a vertical glass of an aquarium for hanging this pump hanger on the aquarium.

DETAILED DESCRIPTION OF THE INVENTION

Figure 1:
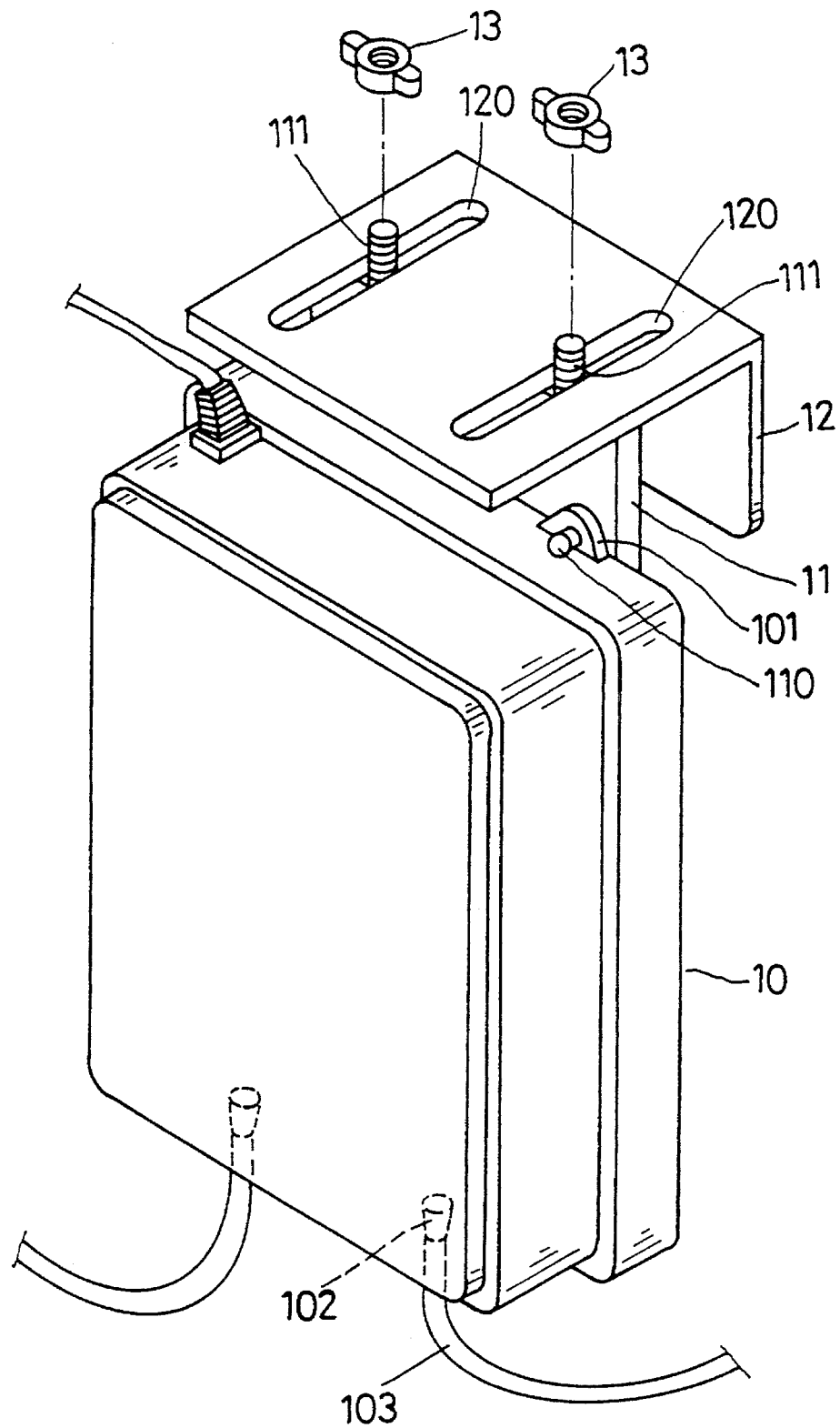
FIG. 1 is an perspective view of a conventional pump hanger for an aquarium.
Figure 2:
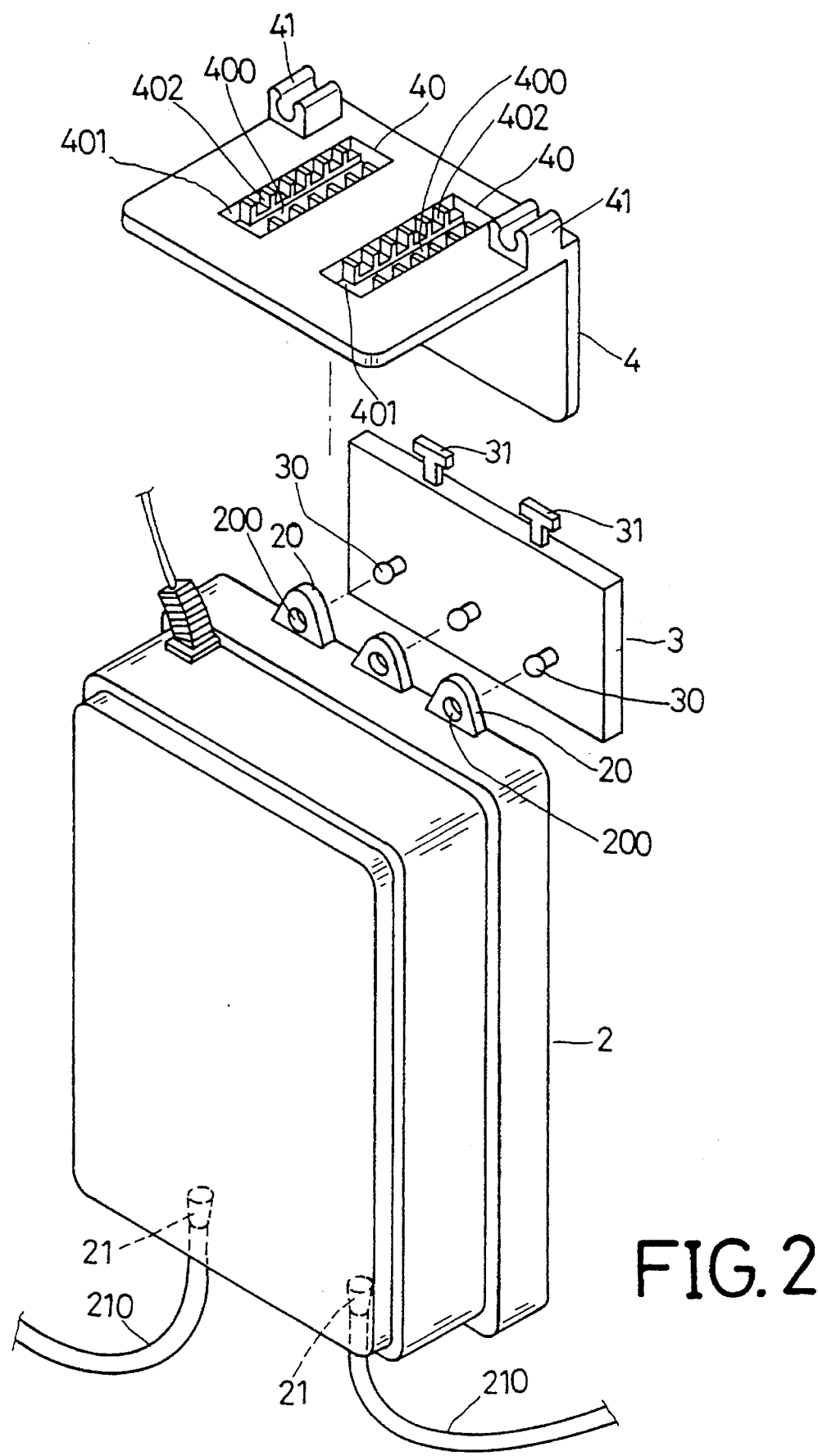
FIG. 2 is an exploded perspective view of a pump hanger for an aquarium in the present invention.

A pump hanger for an aquarium in the present invention, as shown in FIG. 2, comprises a pump 2, a movable vertical plate 3, and an L-shaped plate frame 3 as main components.

The pump 2 has three upright projections 20 bored with a hole 200 spaced apart on an upper rear side edge, two air holes 21, 21 in the bottom, and an air tube 210 respectively fixed on the air hole 21.

The movable vertical plate 3 is preferably shaped as rectangular, having three sidewise posts 30 on a front side to engage the three holes 200 of the three projections 20 so as to combine the movable vertical plate 3 with the pump 2 firmly to move together. The movable vertical plate 3 also has two T-shaped keys 31, 31 spaced on an upper side surface.

The L-shaped plate frame 4 is to be combined with the movable vertical plate 3, having a horizontal portion and a vertical portion, two rectangular recesses 40, 40 in the horizontal portion, a center straight passageway 400 in each recess 40, a lateral through hole 401 in front of the passageway 400 being a little larger than each of the T-shaped key 32 of the movable plate 3, a plurality of divided grooves 402 of the same shape and size of the horizontal portion of the T-shaped key 31 at both sides of the passageway 400 for the T-shaped key 31 to selectably fit therein, and two C-shaped clamps 41, 41 at two opposite sides on the horizontal portion of the plate frame 4.

Figure 3:
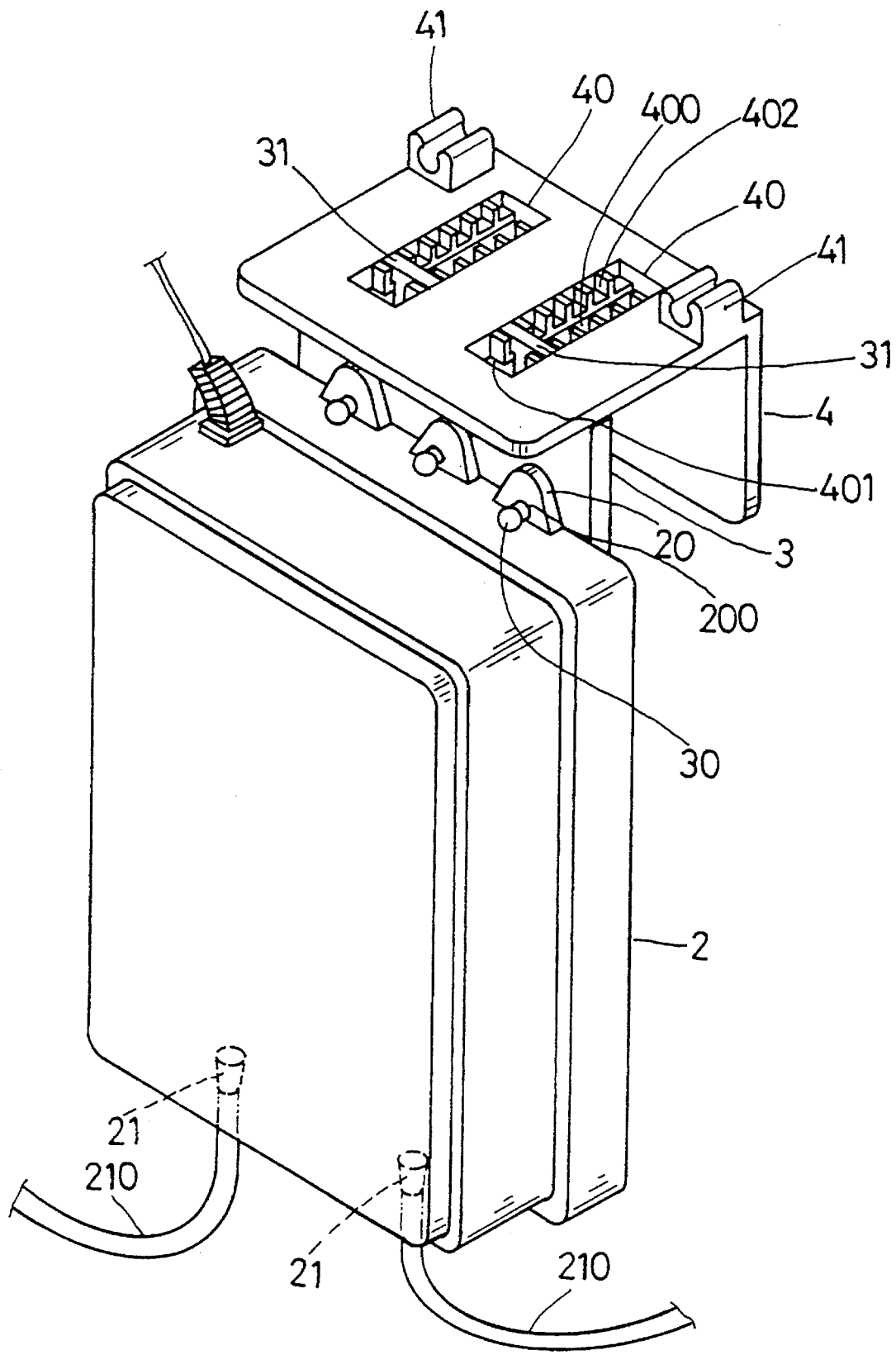
FIG. 3 is a perspective view of the pump hanger for an aquarium in the present invention.
Figure 4:
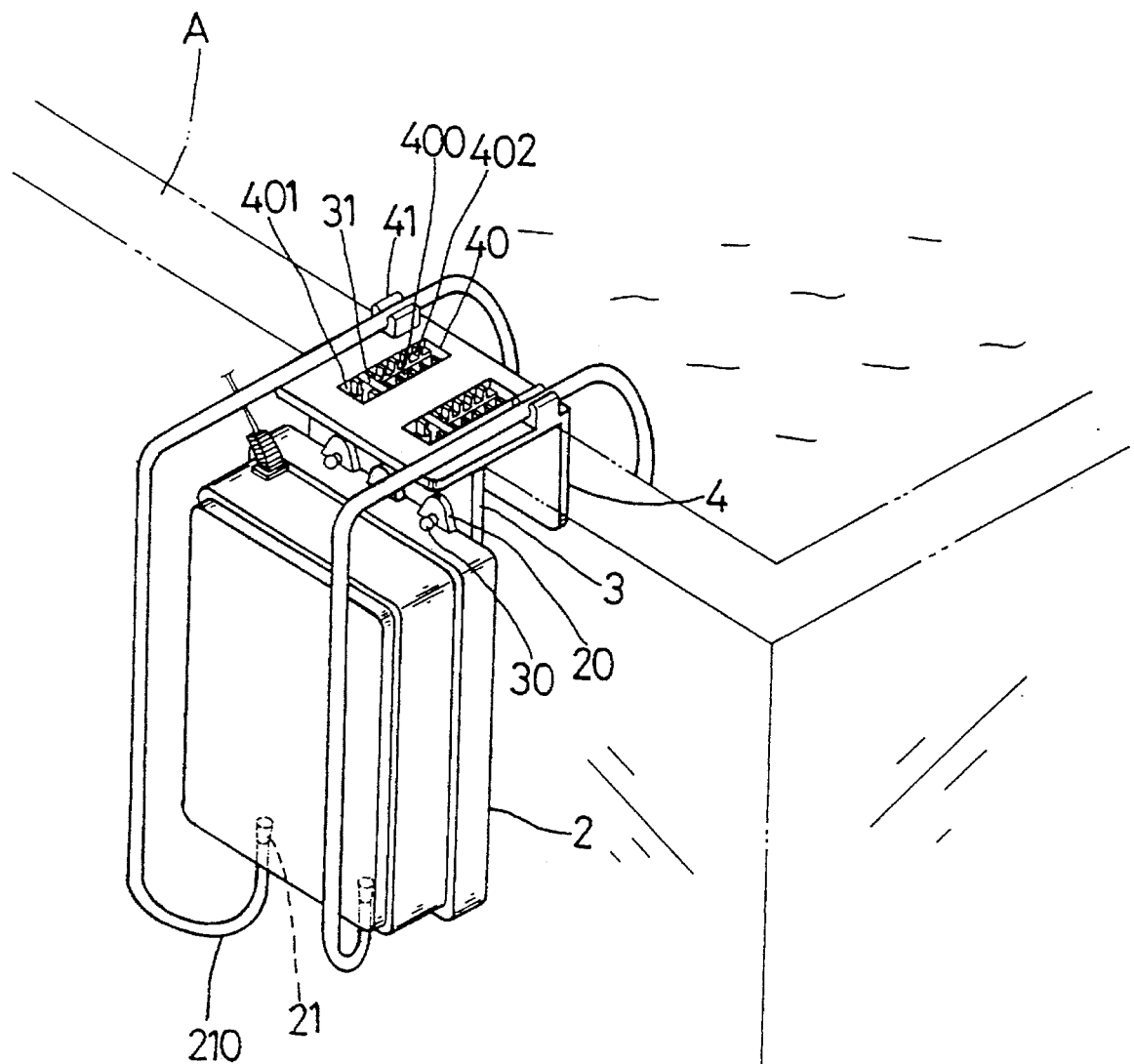
FIG. 4 is a perspective view of the pump hanger for an aquarium in the present invention, showing it applied to an aquarium in one way.
Figure 5:
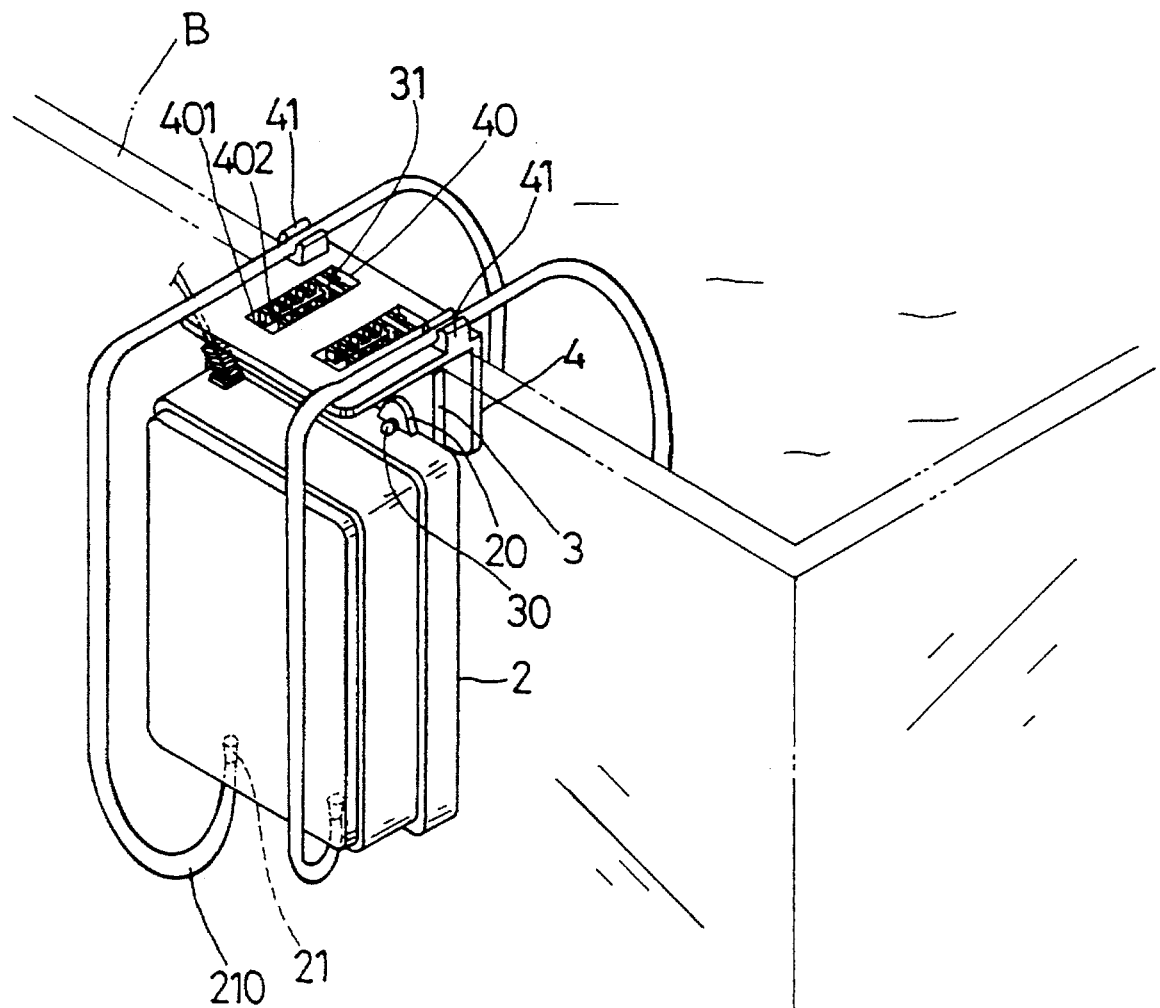
FIG. 5 is a perspective view of the pump hanger for an aquarium in the present invention, showing it applied to an aquarium in another way.

In assembling and using, the movable vertical plate 3 is first combined with the pump 2, with the three posts 30 fitted in the three holes 200 of the projections 20. Then the two T-shaped keys 31, 31 of the vertical plate 3 are made to insert up through the through holes 401, 401 of the recesses 40, 40 above the recesses 40, 40. Then the movable vertical plate 3 is moved back to the point where the T-shaped keys 31, 31 are to be fitted in one of the grooves 402, and the movable vertical plate 3 together with the pump 2 are lowered down, letting the T-shaped keys 31, 31 engage the selected grooves 402. Therefore, the pump 2 is combined with the frame 4 by means of the movable vertical plate 3, and then the two air tubes 210, 210 are compressed in and clamped by the two clamps 41, 41 as shown in FIGS. 3 and 4. Now, this pump hanger is to be hung at an upper end portion of a vertical glass wall B of an aquarium connecting plate 3 and the vertical portion of the plate frame 4 resting on the outer and the inner surface of the glass B. If the glass is rather thin, as shown in FIG. 5, the position of the movable vertical plate 3 is moved nearer to the vertical portion of the frame 4, by pushing up the vertical plate 3 together with the pump 2, disengaging the T-shaped keys 31, 31 from the grooves 402 and moving the movable vertical plate 3 with the pump 2 together backward until the vertical plate 3 contacts the glass B of the aquarium. Then lowering down the plate 3 with the pump 2 together will make the keys 31, 31 engage again the selected grooves 402, 402, adjusting this hanger to the aquarium in a very short time.

As can be understood from the above description, this pump hanger for an aquarium has several advantages as follows.

1. Its combination with an aquarium is easily accomplished by placing the L-shaped plate frame on an upper edge of a vertical glass of an aquarium, and adjusting it is also simple by lifting and moving the movable vertical plate.
2. In adjusting the location of this hanger does not need to handle screws or bolts, increasing its service life.
3. In installing or moving it, the pump is moved together with the movable plate, quite to safe, with no possibility of falling of the pump.
4. The air tubes are only pressed in the clamps to be secured, without extending to any disorderly direction.

What is claimed is:

1. A pump hanger for an aquarium comprising:

a pump having more than one upright projections provided on an upper side edge;

a movable vertical plate preferably shaped rectangular, having one or more sidewise posts spaced aligned horizontal on an outer vertical side to fit in the upright projections of the pump to combine the movable plate with the pump, and one or more T-shaped keys spaced on an upper side surface;

an L-shaped locating plate frame having a horizontal portion and a vertical portion, the horizontal portion having one or more rectangular recesses spaced on an upper surface and two C-shaped clamps on two opposite sides of the upper surface for two air tubes of the pump to be pressed tightly therein, each said recess having a longitudinal center passageway, a lateral through hole formed at the front of the center passageway of each said recess, a plurality of divided grooves on both sides of said passageway; and said T-shaped key(s) fitting up through said through hole(s) of the recess(es) of the L-shaped frame and being moved to engage any of the divided grooves selectably to secure said movable vertical plate, said movable vertical plate being possible to be adjusted in its position, said movable vertical plate and the vertical portion of said frame forming a distanced space adjustable according to the thickness of an aquarium glass so that this pump hanger can be hung on a vertical glass of an aquarium.

* * * * *